(12) United States Patent
Sissons et al.

(10) Patent No.: US 10,869,542 B2
(45) Date of Patent: Dec. 22, 2020

(54) DENTAL BRUSH

(71) Applicants: Peter Sissons, Oxfordshire (GB); Siobain White, Oxfordshire (GB)

(72) Inventors: Peter Sissons, Oxfordshire (GB); Siobain White, Oxfordshire (GB)

( * ) Notice: Subject to any disclaimer, the term of this patent is extended or adjusted under 35 U.S.C. 154(b) by 645 days.

(21) Appl. No.: 15/519,654

(22) PCT Filed: Oct. 23, 2015

(86) PCT No.: PCT/GB2015/053181
§ 371 (c)(1),
(2) Date: Apr. 17, 2017

(87) PCT Pub. No.: WO2016/063078
PCT Pub. Date: Apr. 28, 2016

(65) Prior Publication Data
US 2017/0238693 A1   Aug. 24, 2017

(30) Foreign Application Priority Data

Oct. 23, 2014   (GB) .................................. 1418851.0

(51) Int. Cl.
*A46B 15/00* (2006.01)
*A46B 5/00* (2006.01)
(Continued)

(52) U.S. Cl.
CPC ........ *A46B 15/0036* (2013.01); *A46B 5/0075* (2013.01); *A46B 5/0095* (2013.01);
(Continued)

(58) Field of Classification Search
CPC .................. A61H 13/00; A61H 13/005; A61H 2201/1409; A61H 2201/0153;
(Continued)

(56) References Cited

U.S. PATENT DOCUMENTS 1,859,129 A   5/1932   Costenbader
2,679,657 A *   6/1954   Krueger .................... A46B 7/02
15/172

(Continued)

FOREIGN PATENT DOCUMENTS

JP   2011-030950   2/2011

OTHER PUBLICATIONS

Search Report dated Mar. 26, 2015 in Patent Application No. GB1418851.0 (5 pages).
(Continued)

*Primary Examiner* — Bradley H Philips
*Assistant Examiner* — Vincent D Hoang
(74) *Attorney, Agent, or Firm* — Nixon & Vanderhye, P.C.

(57) ABSTRACT

A brush for cleaning a periodontal pocket between a tooth and a gum of a user. The brush includes, at least, a handle portion, an arm extending from the handle portion, and a brush head located at an end of the arm having a plurality of brush filaments extending therefrom. The brush filaments are configured to be inserted into a periodontal pocket. The brush can be used to assist in the treatment of gum disease by enabling a user to precisely clean periodontal pockets. The brush may be for self-use. Alternatively, the brush may be used by a healthcare professional such as a dentist or hygienist to treat a patient or to demonstrate its use.

18 Claims, 13 Drawing Sheets

(51) Int. Cl.
*A46B 9/04* (2006.01)
*A61C 17/02* (2006.01)
*A46B 11/00* (2006.01)
*A46B 5/02* (2006.01)

(52) U.S. Cl.
CPC ............... *A46B 5/02* (2013.01); *A46B 5/026* (2013.01); *A46B 9/04* (2013.01); *A46B 11/002* (2013.01); *A46B 11/0041* (2013.01); *A46B 11/0096* (2013.01); *A46B 15/0097* (2013.01); *A61C 17/02* (2013.01); *A46B 2200/108* (2013.01); *A46B 2200/1066* (2013.01)

(58) Field of Classification Search
CPC ............ A61H 2201/0157; A61C 17/00; A61C 17/005; A61C 17/0202; A61C 17/0205; A61C 17/028; A61C 17/0211; A61C 17/0217; A61C 17/032; A61C 17/036; A61C 17/084; A61C 17/22; A61C 17/222; A61C 17/224; A61C 17/225; A46B 15/0097; A46B 15/0055; A46B 15/0036; A46B 9/04; A46B 5/0054; A46B 5/0058; A46B 5/0075; A46B 5/0079; A46B 5/0083; A46B 5/0087; A46B 11/0041; A46B 11/0006; A46B 11/001; A46B 11/002
USPC .......................................................... 433/29
See application file for complete search history.

(56) References Cited

U.S. PATENT DOCUMENTS

| | | | | |
|---|---|---|---|---|
| 3,536,065 A | * | 10/1970 | Moret | A61C 17/36 601/96 |
| 4,049,354 A | * | 9/1977 | O'Rourke | A46B 11/0041 401/134 |
| 4,222,143 A | * | 9/1980 | Tarrson | A46B 7/04 15/105 |
| 4,315,741 A | * | 2/1982 | Reichl | A61C 17/28 15/29 |
| 4,374,354 A | * | 2/1983 | Petrovic | H02J 7/0044 320/108 |
| 4,524,478 A | * | 6/1985 | Ross | A46B 5/0016 15/106 |
| 4,619,009 A | * | 10/1986 | Rosenstatter | A61C 17/28 15/29 |
| 4,619,612 A | * | 10/1986 | Weber | A61C 17/0217 433/29 |
| 5,069,621 A | | 12/1991 | Paradis | |
| 5,123,841 A | * | 6/1992 | Millner | A61C 15/00 132/322 |
| 5,205,744 A | | 4/1993 | Weissman | |
| 5,345,645 A | * | 9/1994 | Page | A46B 9/04 15/160 |
| D366,961 S | * | 2/1996 | Barre | D21/621 |
| 5,827,064 A | * | 10/1998 | Bock | A61C 17/20 433/216 |
| 5,850,659 A | * | 12/1998 | Butler | A45D 44/18 15/167.1 |
| 5,896,615 A | | 4/1999 | Zaksenberg | |
| 6,446,640 B1 | | 9/2002 | Gekhter et al. | |
| 7,954,196 B1 | * | 6/2011 | Nault-Richter | A46B 5/0075 15/167.1 |
| 2005/0004498 A1 | | 1/2005 | Klupt | |
| 2005/0214712 A1 | * | 9/2005 | Shaygan | A61C 17/005 433/125 |
| 2007/0113360 A1 | * | 5/2007 | Tsai | A46B 13/008 15/29 |

OTHER PUBLICATIONS

International Search Report and Written Opinion of the ISA for PCT/GB2015/053181, dated Jan. 26, 2016, 10 pages.
Page et al., "Subgingival Root Brushing in Deep Human Periodontal Pockets", Journal of the International Academy of Periodontology 2013; pp. 55-63.
Berezow et al., "Microbial Shift and Periodontitis", Periodontology 2000, vol. 55, 2011, pp. 36-47.
Lundgren et al., "A Single Session of Motivational Interviewing as an Additive Means to Improve Adherence in Periodontal Infection Control: a Randomized Controlled Trial", Journal of Clinical Periodontology 2012; pp. 947-954.
Carey et al., "Subgingival Debridement of Root Surfaces with a Micro-brush: Macroscopic and Ultrastructural Assessment", Journal of Clinical Periodontology 2001; pp. 820-827.

* cited by examiner

DENTAL BRUSH

This application is the U.S. national phase of International Application No. PCT/GB2015/053181 filed 23 Oct. 2015, which designated the U.S. and claims priority to GB Patent Application No. 1418851.0 filed 23 Oct. 2014, the entire contents of each of which are hereby incorporated by reference.

TECHNICAL FIELD

The invention relates to dental hygiene devices. In particular, the invention relates to brush devices that may be used to assist in cleaning teeth, interstitial areas of teeth and gums and periodontal pockets between teeth and gums.

BACKGROUND

Gum disease is a common condition which involves the gums becoming inflamed and/or infected. Gum disease affects a large proportion of the population. If someone suffers from gum disease, it is likely that their gums will bleed when they brush their teeth. In addition, pockets between the teeth and gums of a sufferer of gum disease may develop. Pockets between the teeth and gums may be known as dental pockets or periodontal pockets. Periodontal pockets encompass any pocket that may be formed between a tooth and gums within a mouth of a person. The person may or may not be a sufferer of gum disease. FIG. 1 shows a molar tooth 105 and gums 110 in which periodontal pockets 115 have developed between the tooth 105 and the gums 110.

An early stage of gum disease is known as gingivitis. Untreated gingivitis can develop into periodontitis. Unlike gingivitis which only affects the gums, periodontitis affects deeper tissues in the mouth and the bone and fibres that support the teeth and hold them in place. Both severe and minor periodontitis cases are also prevalent in the population. If periodontitis is not treated, any periodontal pockets present in the sufferer may develop and get deeper. Further, any plaque situated in the periodontal pockets may thrive and multiply causing more destruction of the tissues which support the teeth, leading to advanced gum disease. If someone continues to suffer from periodontitis for an extended length of time, they may eventually suffer tooth loss.

Dental plaque is an adherent mass of bacteria that can reside on teeth and gums. Plaque is the principal cause of almost all forms of gum disease and the formation of periodontal pockets is likely to be the direct consequence of colonization of the gums by bacteria within plaque. Plaque is usually easy to remove from the teeth and gums by brushing and flossing. If plaque is not removed, it can harden to form a substance called tartar, also known as calculus. Tartar/calculus is calcified deposits formed by plaque and can only be removed by a dentist or hygienist. In addition, a dentist or hygienist can show a patient how to clean their teeth effectively to help prevent plaque and tartar build-up in the future.

Dental plaque is one of the primary causes of gum disease. The elimination of plaque from teeth, gums and periodontal pockets will help to prevent and treat gum disease. However, it can be difficult to access periodontal pockets for cleaning and removal of plaque in order to prevent, halt or reverse the onset of gum disease. It can be particularly difficult for a person to effectively clean and remove plaque from periodontal pockets in their own mouth, even with the assistance of a mirror. Further, similar difficulties arise for a dentist or hygienist when treating a patient in relation to gum disease. Some of the problems associated with accessing and cleaning periodontal pockets as identified by the inventors will be described below.

SUMMARY OF THE INVENTION

Conventional dental brushes can be used to clean interproximal areas surrounding teeth, and with other brush heads: teeth, gums, restorations (bridges) and tongues. A typical dental brush comprises a handle, a rounded brush head and a collection of brush filaments extending from a base of the brush head. Such dental brushes may have a smaller brush head in comparison with a typical toothbrush. In addition, such dental brushes may have a smaller and/or more compact set of brush filaments than a typical toothbrush, allowing for more precise cleaning of interproximal areas surrounding teeth. However, conventional dental brushes still have a thickness which exceeds that of the average width of a typical periodontal pocket. It is therefore likely that filaments of the brush head of a conventional dental brush will be fully or partially obstructed from penetrating into a periodontal pocket, thereby preventing effective cleaning of and plaque removal from the interior of the pocket. The obstruction may be caused by the brush filaments located on and near to the outer perimeter of the brush head. In light of this, conventional dental brushes are not suitable for removing plaque from and cleaning periodontal pockets. Further, the thickness of brush heads of conventional dental brushes relative to the width of typical periodontal pockets may prevent or inhibit targeted and precise cleaning of periodontal pockets and cause trauma and discomfort.

Regardless of the method used, cleaning interproximal areas surrounding teeth such as periodontal pockets requires a degree of precision. If a user can clearly see the interproximal areas intended to be cleaned during a cleaning process, it is more likely that a good level of precision can be achieved. In the case of conventional dental brushes and toothbrushes, maintaining a view of the inside of the mouth may not be possible. The handle of a dental brush or tooth brush my obstruct view of the inside of the mouth and the interproximal areas of the teeth to be cleaned. In addition, a hand holding onto the brush handle may provide an additional obstruction to a user's view. The problem of view obstruction may be present when a user of a brush is cleaning areas of their own mouth or when a dentist or hygienist is using a dental brush to clean areas of a patient's mouth or to demonstrate its use.

The inventors have appreciated that even with brushing, the removal of plaque from periodontal pockets would be limited. Brushing prevents the build-up of plaque by disrupting its formation. It may be the case that brushing periodontal pockets containing plaque using a conventional dental brush does not result in a large proportion of the disrupted plaque being removed from the periodontal pockets. If plaque is not removed from periodontal pockets, it may begin to build-up quickly after brushing leading to more or a continuation of gum disease. A mechanism to remove debris generated from the brushing periodontal pockets would therefore be useful to assist with the elimination of plaque from periodontal pockets.

It is an object of the invention to address one or more of the above mentioned problems.

In accordance with a first aspect of the invention there is provided a brush for cleaning a periodontal pocket between a tooth and a gum of a user. The brush comprises: a handle portion; an arm extending from the handle portion; and a brush head located at an end of the arm having a plurality of brush filaments extending therefrom. The brush filaments are configured to be inserted into a periodontal pocket. An angle between a central axis of the handle portion and a central axis of the arm is in the range of 120 to 170 degrees.

The plurality of brush filaments may have a collective diameter no greater than 6 mm.

Optionally the brush further comprises a light source for illuminating the inside of a mouth when the brush is in use.

The arm of the brush may be rotatable about its central axis and relative to the handle portion between first and second positions, wherein in the first a user's hand gripping the handle portion is lower than the user's mouth while cleaning lower periodontal pockets, and wherein in the second position a user's hand gripping the handle portion is lower than the user's mouth while cleaning upper periodontal pockets.

A light source of the brush may be attached to an intermediate portion of the brush that is situated between the handle portion and the arm. The intermediate portion may be rotatable about the central axis of the arm and relative to the arm.

The brush may further comprise a reservoir for holding a liquid and a pumping system configured to deliver the liquid to the brush head. The pumping system may be configured to deliver the liquid from the brush through the plurality of brush filaments extending from the brush head. The reservoir may be rechargeable and the brush may comprise a port for the input of liquid into the reservoir.

The brush may further comprise an internal battery for powering the light source and/or the pumping system.

The brush may comprise a removable base of the handle portion which comprises feet configured to allow the gum brush to stand vertically on a substantially flat surface.

The brush may comprise one or more buttons for operating the light source and/or the pumping system.

The arm of the brush may be detachable from the intermediate portion and handle portion of the brush.

The handle portion of the brush may be configured such that other dental tools, for cleaning interproximal areas between teeth, around restorations (bridges, crowns and implants), tongues may be attached.

The brush apparatus may further comprise an associated stand, wherein one of the brush or stand comprises a male portion and the other of the brush or the stand comprises a female portion, the male and female portions may be configured to cooperate such that the brush is able to rest substantially vertically on the stand.

The handle portion of the brush may comprise an induction coil and the associated stand may be configured to supply electricity to the brush to charge a battery therein.

In accordance with another aspect of the invention there is provided brush for cleaning periodontal pockets and all other parts of the mouth, comprising: a handle portion; an arm extending from the handle portion; and a brush head located at an end of the arm having a plurality of brush filaments extending therefrom. The brush filaments are configured to be inserted into a periodontal pocket, wherein an angle between a central axis of the handle portion and a central axis of the plurality of brush filaments is in the range of 30 to 80 degrees.

Also disclosed herein is an implement capable of cleaning teeth, interstitial areas of teeth and gums, gums, periodontal pockets between teeth and gums, restorations (bridges) and tongues. The implement may be a brush or any other dental tool. Cleaning may involve the disruption and dislodging of plaque from any area of the mouth. A brush as referred to in this disclosure can have any number of filaments. A brush as referred to in this disclosure can have one filament.

BRIEF DESCRIPTION OF THE DRAWINGS

Exemplary embodiments of the invention will now be described with reference to the accompanying drawings, in which.

DETAILED DESCRIPTION

Generally disclosed herein are brushes that can be used to clean teeth, gums, interproximal areas between teeth and around restorations (bridges, crowns and implants), tongues and periodontal pockets. The brushes disclosed herein can be used to assist in the treatment of gum disease by enabling a user to precisely clean periodontal pockets. The brushes may be for self-use. Alternatively, the brush may be used by a healthcare professional such as a dentist or hygienist to treat a patient or to demonstrate its use.

The brushes disclosed herein may comprise: a handle, an arm extending from the handle, and a brush head at the end of the arm. The arm typically extends from the handle at a predetermined angle. Other dental tools may be attachable to the handle. The dental tools may also be configured to assist in cleaning periodontal pockets. The dental tools may also be configured for other dental purposes.

The extension of the arm at an angle means that brush filaments extending from the brush head extrude at an acute angle with respect to a central vertical axis of the handle. The arm may be rotatable about an axis and relative to the handle so as to allow separate configurations of the brush that are favourable for cleaning upper and lower regions of a mouth. There may be an intermediate portion of the brush connecting the arm and the handle. The intermediate portion may also be rotatable about an axis relative to both the handle and the arm separately. Alternatively, the intermediate portion may only be rotatable in unison with the arm. The intermediate portion may not be rotatable and may be fixed in a single position onto the handle. In addition the intermediate portion may comprise a light source. Any rotation of the arm and/or intermediate portion of the brush enables separate configurations of the brush to be adopted that are favourable for cleaning upper and lower regions of a mouth as will be described in more detail later in the description.

The brushes disclosed herein may comprise a reservoir and liquid delivery system. Typically the liquid delivery system is configured such that liquid can be delivered from an opening in a brush head. The liquid delivery systems disclosed herein typically comprise tubing, and a pump with a power supply (e.g. a rechargeable battery) or a hand pump, plunger, squeezable handle or any other method to deliver liquid to the brush filaments.

Possible configurations of the dental brush will be described below with reference to the accompanying drawings.

Figure 1:
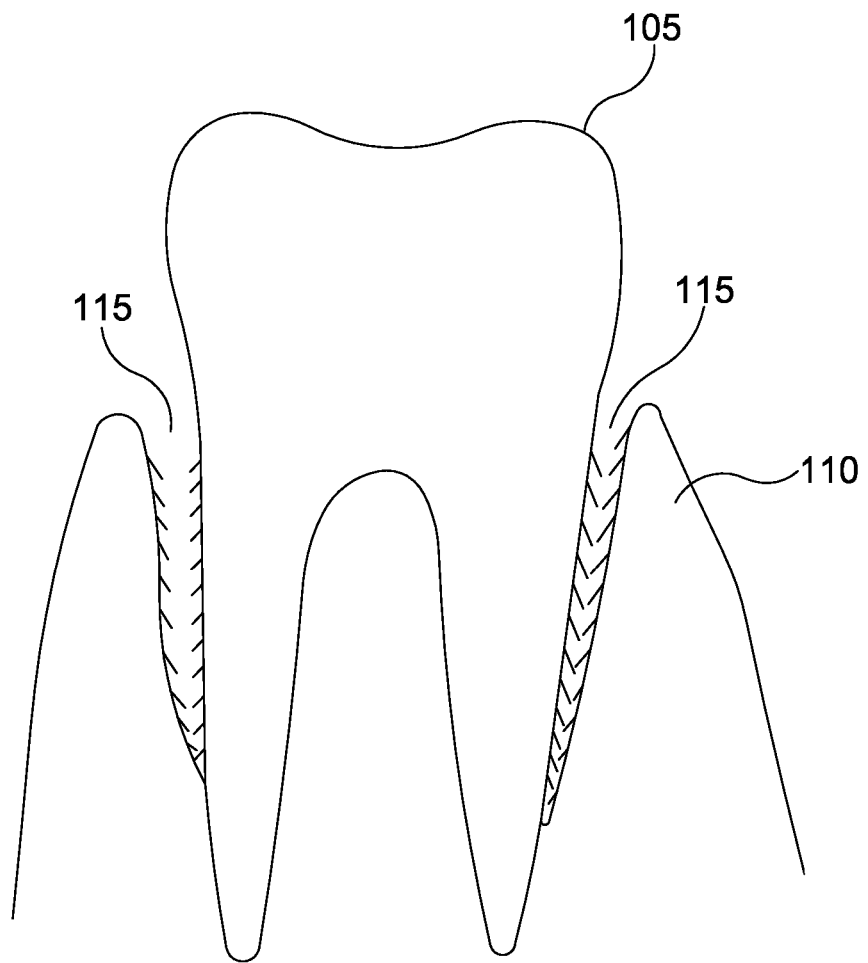
FIG. 1 is a section through an exemplary tooth and gums.
Figure 2:
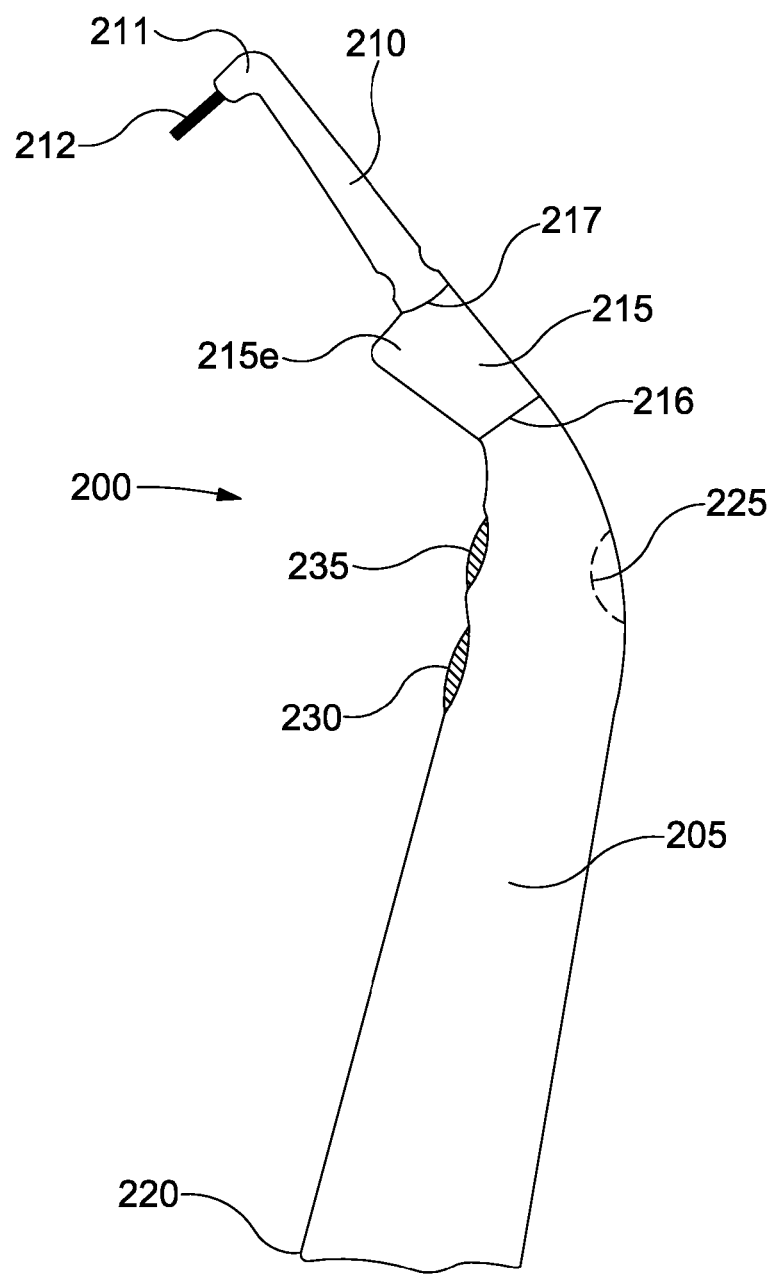
FIG. 2 is a profile view of a brush.

FIG. 2 shows a profile view of an exemplary brush 200. The brush 200 comprises a handle 205, an arm 210, and an intermediate portion 215 that is located between the handle 205 and arm 210 and connects the two units together. The brush 200 comprises a brush head 211 with brush filaments 212 extending therefrom. The brush filaments 212 are arranged to extend in a direction that is substantially perpendicular to a central axis of the arm 210. In other brushes, the brush filaments may extend such that they form an angle in the range of 30° to 90° with a central axis of the arm. In other brushes, the brush filaments may extend such that they form an angle in the range of 30° to 70° with a central axis of the arm. In other brushes, the brush filaments may extend such that they form an angle in the range of 40° to 60° with a central axis of the arm. In other brushes, the brush filaments may extend such that they form an angle in the range of 40° to 50° with a central axis of the arm. It is noted that in other exemplary brushes, the brush filaments 212 may extend at other angles. Due to the bend in the overall geometry of the brush 200, the brush filaments 212 point downwards slightly with respect to the orientation of the brush 200 as shown in FIG. 2.

For ease of description, the exemplary brush 200 will be described with respect to a base 220 of the handle 205 and in a vertical orientation as shown in FIG. 2. The brush head 211 can be considered to be the top of the brush 200 in this description. In FIG. 2, the section of the brush 200 facing the left hand side can be considered to be the front of the brush; the front of the brush 200 is shown in more detail in FIG. 3. Those skilled in the art will appreciate that the brush may be described in a multitude of different orientations. Further, those skilled in the art will appreciate that there could be different labels for and/or perspectives on what constitutes the top, bottom and sides of the brush. Height with respect to the brush is taken to be the absolute measurement of distance from base 220 of the handle 205 to planes parallel to the base 220 that intersect the brush 200.

The handle 205 of the dental brush 200 is substantially cylindrical in shape. The handle 205 is hollow and comprises an associated interior. A sidewall forms an outer lateral surface of the handle 205. For the exemplary brush 200 shown in FIG. 2, the handle 205 has a larger diameter at the base 220 compared to where it joins to the intermediate portion 215. The sidewall of the handle 205 is substantially continuous and smooth. The sidewall of the handle 205 tapers inwardly with height such that the diameter of the handle 205 decreases with height in a continuous manner. The base 220 of the handle 205 is configured such that the handle 205 is inclined at an angle when the dental brush 200 rests on a flat surface. For this exemplary brush 200, the angle of inclination of the handle 205 is approximately 7°. That is, the handle is offset from the vertical by 7° when the brush is in a vertical orientation. In some brushes the angle of inclination may be in the range of 0 to 40°. In some brushes the angle of inclination may be in the range of 0 to 20°. In some brushes the angle of inclination may be in the range of 5 to 10°. However, the skilled person will understand that other angles of inclination are also possible, a key consideration being the position of the centre of gravity of the brush 200. For other brushes, the associated handles may have a uniform cylindrical shape and/or may not be inclined at an angle with respect to a flat surface. The diameter of the handles may vary differently to the brush 200 of FIG. 2 with respect to height.

The base of the handle 205 comprises four feet. The feet extrude downwards from a surface of the base 220. The feet are substantially rounded and smooth such that there is a smooth surface around where the feet extrude from the surface of the base 220. The feet are located in close proximity to and along a perimeter of the base 220. The feet are uniformly spaced apart from one another. The feet are configured such that the brush 200 is self-supporting when the base of the handle 205 rests on a flat surface. The feet also serve the purpose of allowing any water which may accumulate on the base 220 to be dispelled onto a surface and allowing an air-gap between the base 220 and a surface in which water may flow without accumulating on the base 220. Effectively, the feet help reduce the accumulation of water at the bottom of the handle 205. In some brushes, the base of the handle may comprise any number of feet greater than three. Alternatively, the base of the handle may be substantially flat.

At a top section of the handle 205, the handle joins to the intermediate portion 215 of the brush 200. In the region approaching the intermediate section 215, the handle 205 bends laterally and its diameter reduces substantially. In this exemplary brush 200, the handle 205 comprises a port 225. The port 225 is located within the sidewall of the handle approaching the top section of the handle 205. In alternative exemplary brushes, the port could be located at other positions. The port 225 is located of the opposite side of the handle 205 with reference to the bend of the handle 205 in the region approaching the intermediate portion 215. The port may allow a reservoir housed within the brush to be recharged with liquid (see FIG. 8). The handle 205 may comprise a removable lid configured to removably cover the port 225. The lid may be a screwable lid. Alternatively, the lid may comprise a plunger or other liquid-blocking apparatus. When attached to the handle 205, the lid may be flush with the handle 205. Effectively, the lid may be configured to form part of the sidewall of the handle 205 when attached.

The handle 205 of the brush 200 comprises two recessions in its sidewall. A first recession is situated directly below a second recession. The recessions are located in close proximity and approaching the top section of the handle 205. The recessions are located on the same side of the handle 205 as the bend of the handle 205 in the region approaching the intermediate portion 215. User-operable buttons 230, 235 are situated within each of the recessions. Within each of the recessions, the sidewall may comprise one or more holes allowing for operation of each of the buttons to be communicated either electronically or mechanically to within the interior of the handle 205.

The top of the handle 205 is connected to the intermediate portion 215. The intermediate portion 215 is also substantially cylindrical in shape. The intermediate portion 215 comprises a sidewall and an interior. The intermediate portion 215 is fixed to the handle 205. The intermediate portion 215 may be joined to the handle through an interference fitting. The fitting may comprise a catch or any other retaining fixture such that when the intermediate portion 215 is inserted to a recess (possibly during manufacture) on the handle 205, the catch operates to retain the section in place.

In other exemplary brushes, the intermediate portion 215 may be detachable from the handle 205 by a user. In other brushes, any known method of connecting dental tool components may be used to connect the intermediate portion to the handle.

The sidewall of the intermediate portion 215 is continuous and smooth. The sidewall is flush with the sidewall of the handle 205 at the top of the handle. In other words, there is a smooth transition in the outer surface of the sidewall of the handle 205 and the outer surface the intermediate portion 215. A join line 216 between the intermediate portion 215 and the handle 205 is visible. In some brushes, the outer surface of the brush may be textured, smooth or any combination thereof.

The intermediate portion 215 comprises an extrusion 215e of the sidewall at one side. In FIG. 2, the extrusion 215e is to the left side of the intermediate portion 215; that is, on the same side as the direction of the bend of the handle 205 in the region approaching the intermediate portion 215. The extrusion 215e begins at the bottom of the intermediate portion 215 where it meets the top of the handle 205. The extrusion 215 becomes more pronounced with height along the intermediate portion 215. The extrusion abruptly ends towards a top end of the intermediate portion 215 where the intermediate portion 215 joins to the arm 210. The abrupt ending to the extrusion provides for a small and substantially flat surface. In this exemplary brush 200, the substantially flat surface is substantially circular in shape. In other brushes, the substantially flat surface may be any other shape. Alternatively, the intermediate portion of a brush may not comprise a substantially flat surface. This small substantially flat surface may comprise a light source fitting and hole that allows for a power source to connect to the light source. The light source is configured to illuminate the interior of a user's mouth while the brush 200 is in use. The light source may be integrated with the extrusion so as to directly form part of the small surface (i.e. the light source would not be fixed to a light source fitting in the small surface of the extrusion, but instead would form the surface of the extrusion itself). In other brushes, the intermediate portion may not comprise a light source and/or an extrusion.

The top of the intermediate portion 215 is connected to the arm 210 of the brush 200. The arm 210 is substantially cylindrical in shape. The arm 210 is detachable from the intermediate portion 215. The arm 210 may be connected to the intermediate portion via an interference fitting. The fitting may comprise a catch or 'clickable' mechanism to assist in securing the arm 210 in place within a recess of the intermediate portion 210. A join line 217 between the intermediate portion 215 and the arm 210 is visible.

The diameter of the arm 210 decreases slightly with height. The arm 210 comprises a sidewall and an interior. There is a slight recession in the sidewall of the arm in close proximity to where it joins to the intermediate portion 215. The recession is a uniform decease in diameter of the arm 210 around a specific perimeter of the arm 210. The recession is symmetrical about the central axis of the arm 210. The surface of the sidewall of the arm 210 is smooth and continuous. The sidewall of the arm 210 is flush with the sidewall of the intermediate portion 215 where the two units connect. There is a smooth transition in the outer surface of the sidewall of the arm 210 and the outer surface the intermediate portion 215.

The arm 210 comprises the brush head 211. The brush head 211 is situated at the top of the arm 210. The brush head 211 is formed of a bend at the top of the arm 210 and a transition to a circular face. An associated normal vector of the circular face is approximately perpendicular to the central axis of the arm 210. The brush head 211 has a smooth and continuous surface. The transition of the sidewall of the arm 210 in the bend and circular face that form the brush head 211 is smooth and continuous. The circular face of the brush head 211 is smooth and rounded along its perimeter with the rest of the arm 210.

The circular face of the brush head 211 comprises fittings for brush filaments to be attached. In the exemplary brush 200, brush filaments 212 extend from the circular face of the brush head. The brush filaments 212 extend in a direction perpendicular to the circular face of the brush head 211. In one exemplary brush there are approximately 50 brush filaments 212. In other brushes there may be any number of brush filaments in the range of 1 to 10000. The collective diameter of the brush filaments 212 is not greater than 6 mm. In exemplary brushes, the diameter of the brush filaments is in a range from 1 mm to 5 mm. In a specific exemplary brush the diameter of the brush filaments is in a range from 2 mm to 4 mm. A person skilled in the art would appreciate that different numbers of brush filaments 212 may be used dependent on their individual diameters to achieve the overall diameters mentioned above. The brush filaments 212 run substantially parallel to one another.

Figure 3:
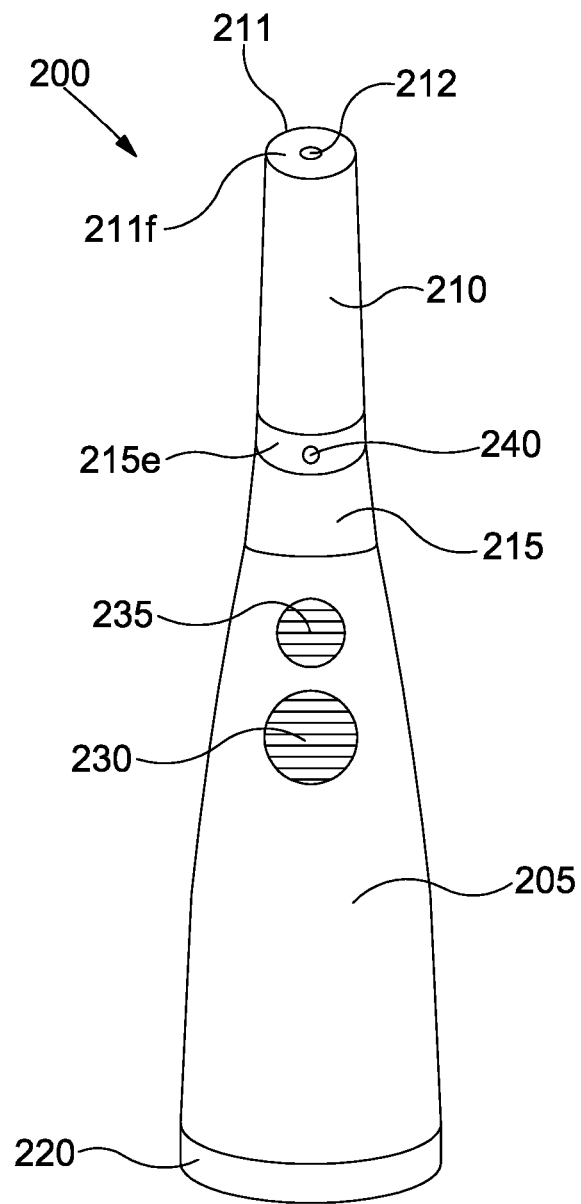
FIG. 3 is a front view of a brush.

FIG. 3 shows a front view of the exemplary brush 200 of FIG. 2.

The two buttons 230, 235 situated within the recessions in the sidewall of the handle 205 are round. The first button 230 that is situated above the second button 235 has a larger diameter. However, the buttons 230, 235 may have the same diameter. The buttons 230, 235 may comprise any appropriate material and components such as: a resiliently deformable material for a user to press; a switch, a spring loaded mechanism; a touch sensor; a heat sensor; a slider; a catch or any other form of electrical or mechanical input mechanism. In other brushes, the diameters of the two buttons may be equal or vary differently to the exemplary brush of FIG. 3. Further, the handle may comprise more than two recessions in the sidewall of the handle 205 and with it, more than two user-operable buttons. Alternatively, or in addition, the buttons 230, 235 or further buttons may be situated on other components of a brush, such as an intermediate portion or arm. A brush may comprise one or more user-twistable sections to control one or more functions of the brush. A brush may also comprise apparatus enabling functions of the brush switch-on through a speech-activation, The base 220 of the handle 205 is separable from the brush 200. Separating the base 220 from the remainder of the brush 200 allows access into the interior of the handle and the components stored therein. Alternatively, in other brushes the handle may comprise an access panel which can be removed to expose some or the entire interior of the handle. The access panel may be removably fastenable to the handle by means of a 'click' or screw mechanism.

The base 220 may attach the remainder of the handle 205 by any of: an interference fit, a screw fitting, a latch or any over means by which to removably fasten the base 220 to the handle 205. When connected to the brush 200, the base 220 and the remainder of the handle 205 form a smooth seam at the connection point that extends around a perimeter of the handle.

There is also a seam that extends around a perimeter of the brush 200 where the handle 205 and intermediate portion 215 meet. The intermediate portion 215 may be removable from the handle 205. The edge sidewall of the handle 205 that meets with the intermediate portion 215 is substantially circular and is located at the end of the substantially cylindrical shape of the handle 205. The edge of the sidewall of the intermediate portion 215 that meets the handle 205 has substantially the same shape as the edge of the sidewall of the handle 205. With exception to the smooth seam, the outer surfaces of the handle 205 and intermediate portion 215 merge in a smooth and continuous manner.

The substantially flat surface of the extrusion 215e of the intermediate portion 215 is visible in FIG. 3. A light source 240 is situated on the flat surface. The light source may be a light-emitting diode. The light in FIG. 3, the light source is arranged such that light it emits is directed towards the brush filaments 212. In other brushes, a light source may be situated within the interior of the arm. The arm may be formed of a transparent or translucent material which can be illuminated by the light source. The sidewall of the arm may be configured to act as a waveguide which directs light to the brush head of the arm. The brush filaments individually or in combination may also act as a waveguide for directing light from the light source to an area of a mouth.

The arm 210 of the brush 200 is connected to the intermediate portion 215 above the point where the extrusion 215e from the intermediate portion 215 terminates. In other words, the arm 210 joins to the intermediate portion adjacent to and slightly above the substantially flat surface. As with the connection between the handle 205 and the intermediate portion 215, the respective edges of the sidewalls of the arm 210 and intermediate portion 215 which connect are substantially circular. Further, the edges are substantially matching. Apart from a seam between the sidewalls of the arm 210 and intermediate portion 215, the outer surfaces of the intermediate portion 215 and the arm 210 merge in a smooth and continuous manner.

The circular face 211f of the brush head 211 can be seen in FIG. 3. The diameter of the circular face 211f is approximately equal to the diameter of the arm 210 at the top of the brush 200. The brush filaments can be seen attached to the circular 211f face of the brush head 211. The edges of the circular face 211f are rounded and merge smoothly with the remainder of the brush arm 210.

As can be seen from FIGS. 2 and 3 showing the exemplary brush 200, the length of the handle 205 exceeds that of the arm 210 and intermediate portion 215. The length of the intermediate portion 215 is less than that of the handle 205 and the arm 210. The widest diameters of the arm 210 and the intermediate portion is less than the widest diameter of the handle. A skilled person would appreciate that relative sizes of the components of the brushes described herein could be customised without departing from the teaching of the present disclosure. Further, dimensions of the brushes and/or components described herein could be customised without departing from the teaching of the present disclosure.

Figure 4:
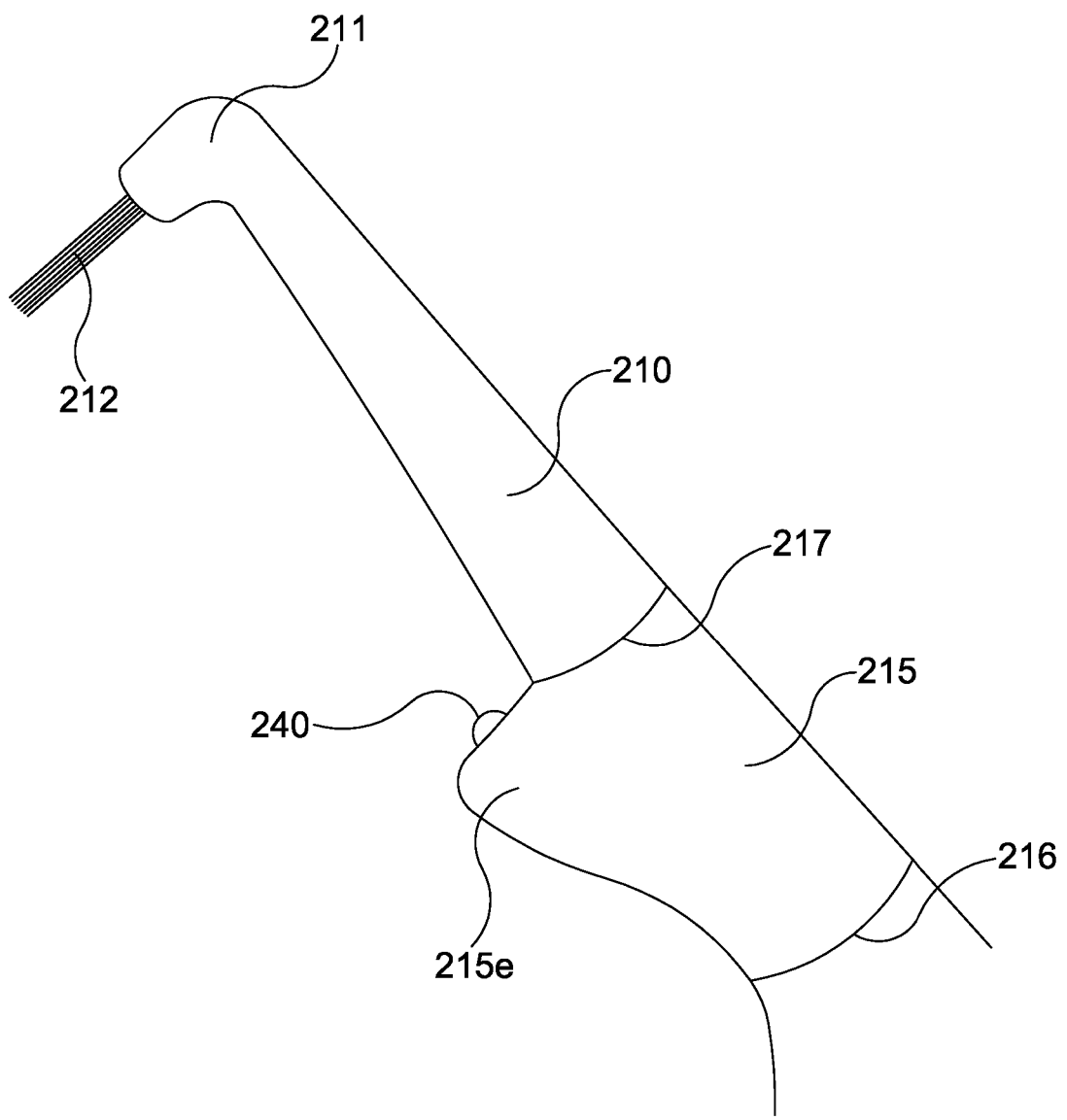
FIG. 4 is a profile view of a brush, brush arm and intermediate portion of a brush.

FIG. 4 shows the brush filaments 212, arm 210 and intermediate portion 215 of the exemplary brush 200 of FIG. 2. The brush head 211 can be viewed in more detail in this Figure. The bend in the arm 210 that forms the brush head forms a substantially right-angled turn. The corners of the turn are chamfered and filleted respectively to maintain the smooth surface of the sidewall of the arm 210 for user comfort.

Figure 5:
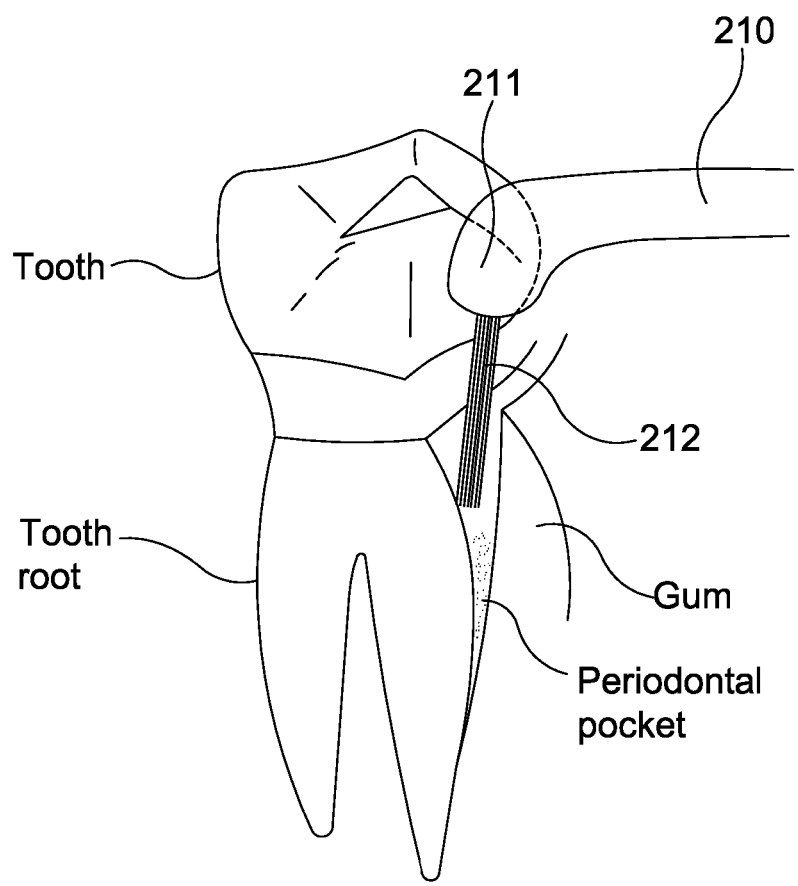
FIG. 5 is view of a brush being used to clean a periodontal pocket.

FIG. 5 shows the exemplary brush 200 of FIGS. 2 to 4 in use. As can be seen for the Figure, the filaments 212 of the brush 200 have been inserted into a periodontal pocket. The periodontal pocket comprises sub-gingival plaque and tartar/calculus. The brush 200 is configured to clean the periodontal pocket by disrupting and dislodging the plaque. The brush 200 does not have to be limited to this one application. The gum brush could possibly be used to clean teeth, gums and interproximal areas between teeth, restorations (bridges, crowns and implants), tongues and dental pockets using a variety of head attachments.

As is evident from FIG. 2, the intermediate portion 215 and arm 210 extend at an angle from a central axis of the handle 205 of the brush. There is an overall bend in the geometry of the brush 200. For clarity, the angle between the intermediate portion 215 and arm 210 and the handle 205 is defined as being the angle between a central axis of the handle and a central axis of the arm 210. If there was no overall bend in the geometry of the brush 200, the arm 210 and intermediate portion 215 would not extend at an angle from the handle portion 205; in other words, the angle between the two central axes would be 180°. With the overall bend in the geometry of the brush 200, the angle between the two central axes is less than 180°.

In the exemplary brush 200 of FIG. 2, the angle between the central axis of the handle 205 and the central axis of the arm 210 is 140°. In some brushes the angle may be any angle less than 180°, In some brushes the angle may be any angle less than 170°, In some brushes the angle may be any angle less than 160°, In some brushes the angle may be any angle less than 150°, In some brushes the angle may be any angle in the range 90° to 180°, In some brushes the angle may be any angle in the range 100° to 170°, In some brushes the angle may be any angle in the range 110° to 160°, In some brushes the angle may be any angle in the range 120° to 150°, In some brushes the angle may be any angle in the range 130° to 150°, The bend in the brush in the configuration shown in FIG. 2 assists when it comes to cleaning periodontal pockets that reside next to the lower teeth and gums in a subject's mouth. The bend allows for the brush to clean the lower periodontal pockets with the handle being held below the lower lip line of the subject's mouth. The bend in the brush 200 allows for the brush head 211 and brush filaments 212 to be clearly visible when inside a subject's mouth. By holding the handle below the lip line of the subject's mouth there is less obstruction of the view inside the mouth from a user's hand and/or the brush 200 itself. The above advantages apply similarly when the brush 200 is being used to clean a patient's periodontal pockets by a healthcare professional or to demonstrate the brush and when a user of the brush 200 is cleaning their own periodontal pockets.

The intermediate portion 215 and arm 210 of the exemplary brush 200 are independently rotatable about a central axis of the arm. The rotation may be in either direction. The join line 217 visible between the intermediate portion 215 and the arm 210 of the exemplary brush 200 may constitute part of a rotatable joint of the intermediate portion 215 and the arm 210. The opposing surfaces of the arm 210 and the intermediate portion 215 which form the join line 217 are configured to enable separate, unobstructed rotation of either the arm 210 or the intermediate portion 215. The intermediate portion 215 and arm 210 of the exemplary brush 200 are rotatable relative to the handle 205. The rotation may be in either direction. The join line 216 visible between the handle 205 and the intermediate portion 215 of the exemplary brush 200 may constitute part of a rotatable joint of the handle 205 and the intermediate portion 215, The opposing surfaces of the handle 205 and the intermediate portion 215 which form the join line 216 are configured to enable separate, unobstructed rotation of the intermediate portion 215. In other brushes, the intermediate portion and arm may not be independently rotatable or even rotatable in unison. In some brushes, the connection between the intermediate portion and the arm may comprise a key which restricts rotation of the intermediate portion to be in unison with the arm. A key may be located in the connection between the intermediate portion and the handle so as to fit the intermediate portion in place with no option to rotate it.

Figure 6A:
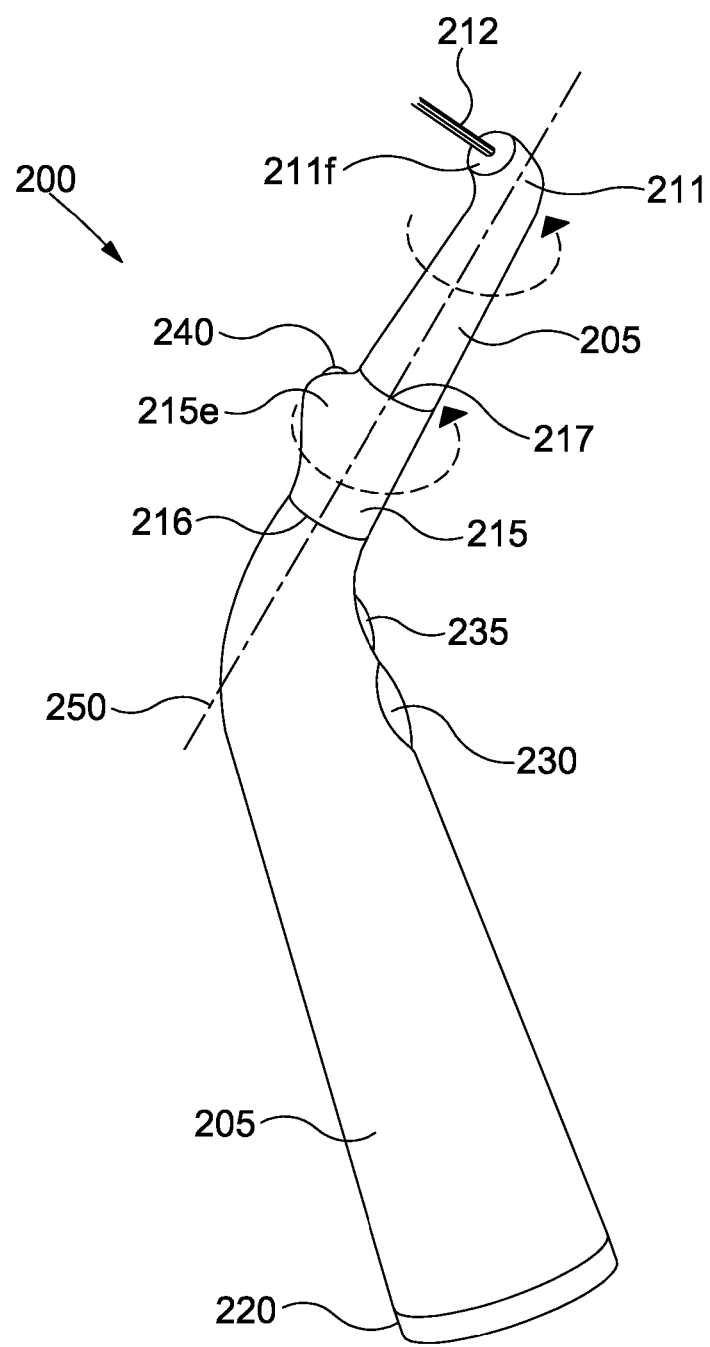
FIG. 6A is a perspective view of a brush.

FIG. 6A shows the exemplary brush 200 of FIG. 2 in which the intermediate portion 215 and arm 210 have been rotated 180° about the central axis 250 of the arm and relative to the handle 205. It may be that the brush 200 comprises a stopping mechanism which allows the arm and intermediate portion to be fixed in either the position shown in FIGS. 2, 3 and 4, or in FIG. 6. The stopping mechanism may be a 'click' stopping mechanism which operates in 45 degree increments. The stopping mechanism may be a 'click' stopping mechanism which operates in any set degree increments. The clicking mechanism may operate on rotation of the arm 210 either clockwise, anticlockwise or in either direction. The stopping mechanism may eliminate the risk of the orientation of the brush 200 changing due to forces on it during cleaning of a periodontal pocket. Changes to the arrangement of the brush may disrupt cleaning and cause an inconvenience to a user. The stopping mechanism may also limit rotation of the arm 210 and/or the intermediate portion 215 to 180 degrees in either direction from a starting position represented in FIG. 2, The arrangement of the brush as shown in FIG. 6A may be most suitable for cleaning periodontal pockets that reside next to the upper teeth and gums in a subject's mouth. With the arrangement shown, the filaments 212 of the brush 200 can be inserted into the upper periodontal pockets with the subject's mouth with the handle 205 still being held below the lower lip line of the subject. As with the earlier describe arrangement, there is still a bend in the brush 200. With the arrangement of FIG. 6, the brush filaments 212 point away from the direction of curvature of the bend.

In the arrangement of FIG. 6A there is less obstruction of the view inside the mouth from a user's hand and/or the brush 200 itself. The above advantages apply similarly when the brush 200 is being used to clean a patient's upper periodontal pockets by a healthcare professional or for demonstrations and when a user of the brush 200 is cleaning their own upper periodontal pockets.

Figure 6B:
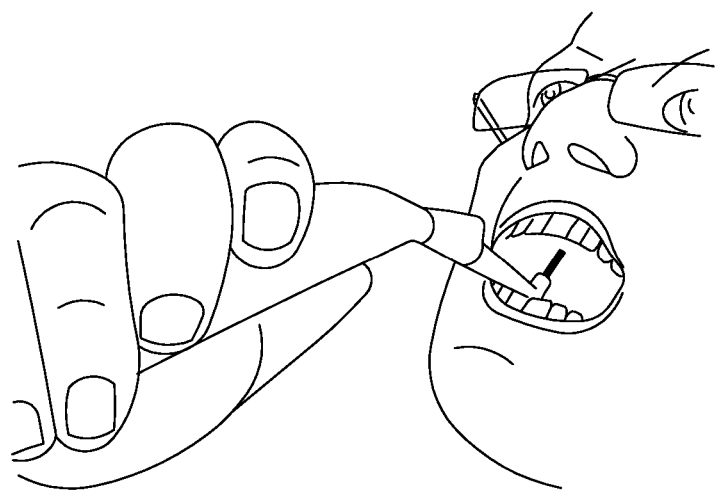
FIG. 6B is an illustration of the brush of FIG. 6A in use.

FIG. 6B shows an exemplary brush in use cleaning upper periodontal pockets in a subject's mouth. The exemplary brush is in a similar configuration to the brush shown in FIG. 6A. The intermediate portion and arm have been rotated 180° from a starting position (such as the position of the arm and intermediate portion of FIG. 2). The extrusion of the intermediate portion and the brush filaments face away from the direction of curvature of the brush. As described above, this configuration of the brush is favourable for cleaning upper periodontal pockets in a subject's mouth. As can been seen from the Figure, the upper periodontal pockets can be cleaned whilst the handle of the brush is held (by the subject or another person) below the lip level of the subject's mouth.

Figure 6C:
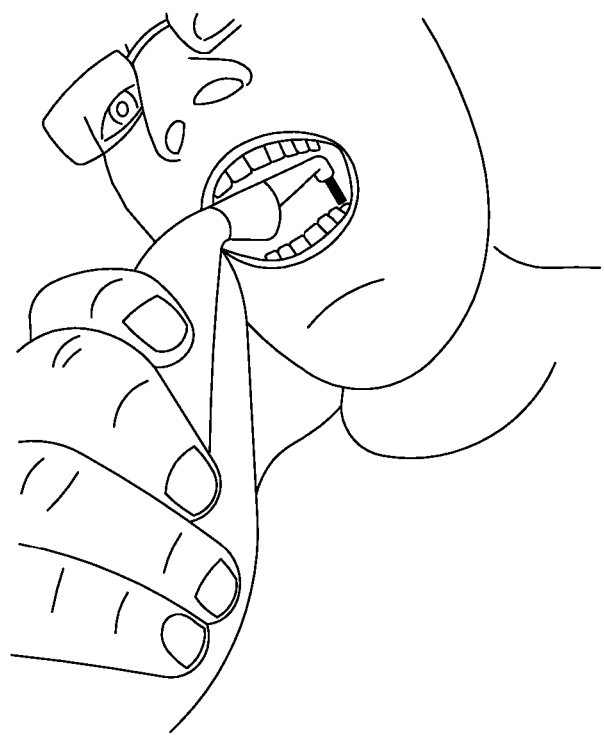
FIG. 6C is an illustration of the brush of FIG. 6A in use.

FIG. 6C shows the exemplary brush of FIG. 6B in use cleaning lower periodontal pockets in a subject's mouth. The exemplary brush is in its standard configuration with the extrusion of the intermediate portion and brush filaments facing away from the direction of curvature of the brush. As can been seen from the Figure, the lower periodontal pockets can be cleaned whilst the handle of the brush is held (by the subject or another person) below the lip level of the subject's mouth.

Figure 7:
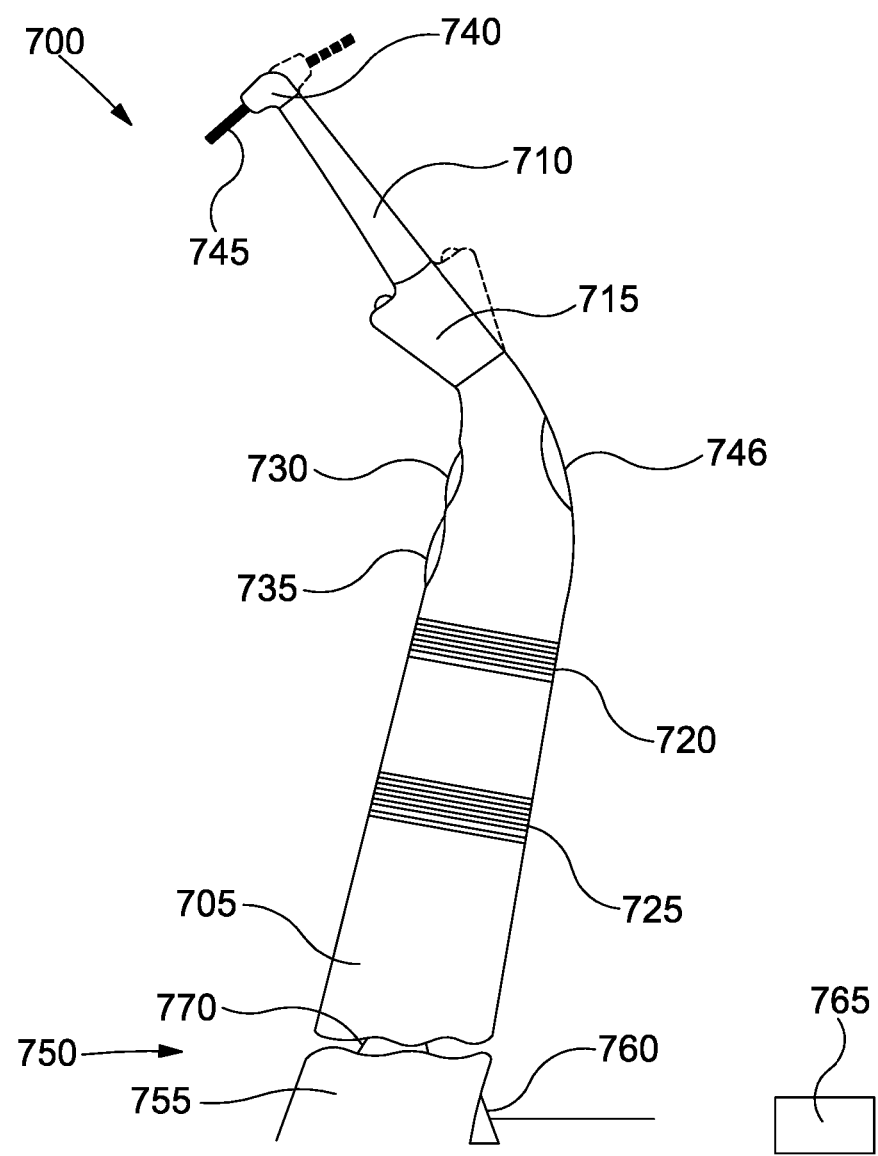
FIG. 7 is a schematic profile view of a brush.

FIG. 7 shows another exemplary brush 700 in a profile view. The brush 700 comprises a handle 705, an arm 710, and an intermediate portion 715 that is located between the handle 705 and arm 710 and connects the two units together. The brush is configured similarly to the exemplary brush 200 of FIG. 2. Outlines of an alternative arrangement of the brush are shown. The arrangement corresponds to where the intermediate portion 715 and arm 710 of the brush have been rotated 180° about a central axis of the arm 710 relative to the handle 705.

The brush 700 further comprises two gripping elements 720, 725. The gripping elements 720, 725 are situated on the handle 705 for this brush 700. However, the skilled person would appreciate that gripping elements could be placed elsewhere on the brush. The gripping elements 720, 725 are each a series of bands of rubber which extend around the sidewall of the handle 705. The gripping elements 720, 725 may be made of any material and any shape/configuration so as to assist a user in keeping a firm hold of the brush 700.

The exemplary brush also comprises two user operable buttons 730, 735; a brush head 740 with brush filaments extending therefrom 745 and a port with a lid 746.

In addition, the arrangement of the exemplary brush 700 of FIG. 7 also includes an associated stand 750. The stand 750 comprises a main body 755 which is configured to rest on a flat surface. The stand 750 is connected to an external power source 765 via a power adapter 760. The external power source 765 provides the stand 750 with electricity. The external power source 765 is in this case a mains supply of electricity. However, in other brushes, an associated stand may be powered by other means such as by one or more batteries or by solar energy. Further, it may be that a stand has no power source.

The stand comprises an extrusion 770 from the main body 755. The extrusion 770 is a conical shape. The extrusion 750 is vertical with the tip of the conical shape pointing away from the main body 755 of the stand 750. The handle 705 of the brush 700 has a corresponding conical shaped recession within its base. The conical shaped extrusion and recession are male and female components and are configured to allow the brush 700 to dock on the stand 750. The male and female components and the stand are configured to support the brush 700 in a vertical orientation (as shown) when it is docked with the stand 750. The male and female components of the brush 700 and the stand 750 may be swapped; that is the brush 700 may comprise a male component configured to engage with a female component situated on the stand 750. The components may be any suitable corresponding shapes that can be used for docking the brush 700 with the stand 750.

Similar to the brush 200 of FIG. 2, the handle 705 of the brush 700 may comprise a base which is separable from the brush 700. The base may cover the recession in the handle that is configured for docking the brush 700 with the stand 750. The base may comprise feet as described for the brush 200 of FIG. 2. In this exemplary brush 700, the bottom of the handle 705 comprises feet adjacent to the conical recession of the handle 705. The feet are evenly spaced around the perimeter of the bottom of the handle 705.

The main body 755 of the stand 750 comprises further extrusions. The extrusions are evenly spaced around the perimeter of the top of the main body 755 of the stand 750. The extrusions are configured to engage with the feet evenly spaced around the perimeter of the bottom of the handle 705 when the brush 700 is docked on the stand 750. The extrusions engage with the feet such that there are gaps between the brush 700 and the stand 750 when the brush 700 is docked. The gaps are situated in the areas adjacent to the feet of the handle 705 and extrusions of the stand 750. The above described configuration of the main body 755 of the stand 750 and handle 705 of the brush 700 prevents stagnant water from accumulating on the stand 750. Alternatively, the stand may not comprise any further extrusions or gaps as described above, and may be substantially flat around the extrusion 770.

When docked with the stand, any water on the brush 700 may run down the brush 700 and onto the main body 755 of the stand 750. The feet of the handle 705 of the brush provide a pathway for water to run onto the main body 755 of the stand 750. Water from the brush 700 can be transferred to the extrusions spaced along the perimeter of the top of the main body 755 of the stand 750. Rather than accumulate, the surface of the top of the main body 755 is inclined such that water will run down a sidewall of the main body 755 and onto a surface on which the stand 750 rests. The configuration of the stand 750 and handle 705 is advantageous in that it minimises the amount of water that can accumulate on both the brush 700 and the stand 750. The accumulation of stagnant water may be unhygienic. Further, the accumulation of water close to the conical extrusion of the main body 755 of the stand 750 and the conical recession of the handle 705 of the brush may be unfavourable due to electronic components which may be situated in these areas. In other brushes, an associated stand and handle may take any other configuration which includes a docking system. Further, in some brushes the docking configuration may be omitted altogether. In addition, or alternatively, a brush may comprise an associated wall mounted charging system which may include magnets. In addition, or alternatively, a brush may comprise an associated induction mat which the brush can be placed on to charge its battery.

As can be seen from FIG. 7, the brush 700 is engaged with the stand 750 such that the brush 700 is in a vertical orientation. This vertical orientation involves the handle 705 of the brush being inclined at an angle of 7°. However, the skilled person will understand that other angles of inclination are also possible, a key consideration being the position of the centre of gravity of the brush 200. The stand 750 may provide support to the brush 700 to remain in this orientation. In other configurations, the brush may be self-supporting in a vertical orientation when resting on a flat surface and the stand 750 may configured purely for the delivery of power to the brush 700 as will be discussed in more detail later.

The stand 750 may conform to a degree to the shape 750 of the handle of the brush 700. The stand 750 may be made out of any suitable material. The stand 750 may predominantly be made out of the same material as the brush 700.

Figure 8:
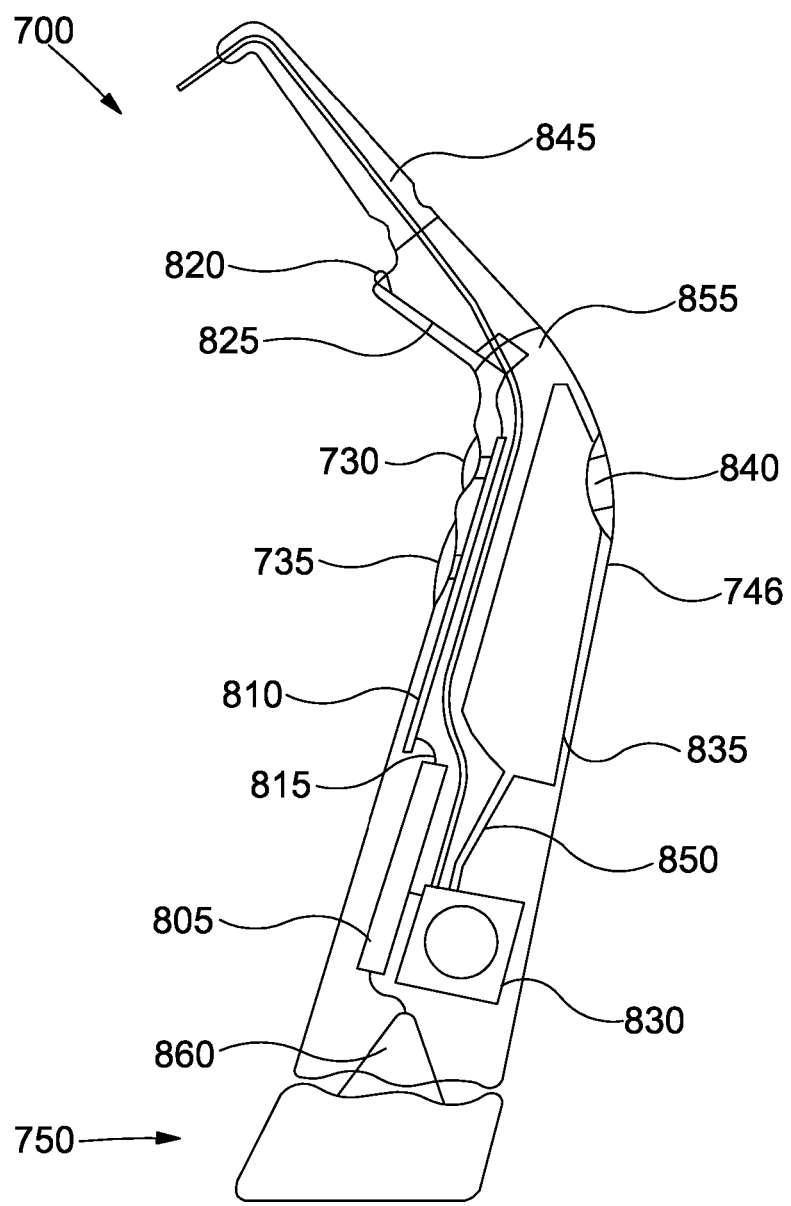
FIG. 8 is a cross section of an interior of a brush.

FIG. 8 shows a cross section of the exemplary brush 700 of FIG. 7. In this Figure, internal components of the brush 700 are shown. The components are situated within the interior of the handle, the interior of the intermediate portion and the interior of the arm. In other brushes, some of or all of the components may be located in different areas of a brush in comparison with the exemplary brush 700 of FIG. 8. In other brushes some or all of the components may be omitted or located externally.

Within the handle 705 of the brush 700 there is a battery 805. The battery is mounted to a fitting within the interior of the handle 705. The battery 805 may be any of a lead-acid, nickel cadmium (NiCd), nickel metal hydride (NiMH), lithium ion (Li-ion), or lithium ion polymer (Li-ion polymer) battery or any other type of power source. The battery 805 in this exemplary brush 700 is rechargeable.

The battery 805 is connected to an electronics board 810 via an electrical connection 815. The electronics board 810 is mounted within the interior of the handle 705. In this exemplary brush, the electronics board 810 is mounted adjacent to the two buttons 730, 735 located on the sidewall of the handle 705. When either of the buttons 730, 735 are operated the operation can be electrically or mechanically communicated to the electronics board 810. The electronics board 810 is configured as a controller for controlling the operation of the other components within the brush 700. The electronics board may comprise any of a printed circuit board, an integrated circuit board, a processor, a microprocessor and any standard electronic components. The electronics board 810 in this exemplary brush 700 runs substantially parallel to a portion of the sidewall of the handle 705.

The exemplary brush 700 of FIGS. 7 and 8 comprises a light source 820. The light source 820 is fitted on the extrusion of the intermediate portion 715 of the brush 700. The light source is connected, via an electrical connection 825, to the electronics board 810. The electrical connection 825 runs within the interior of the intermediate portion 715 and handle 705 of the brush and is connected to a top end of the electronics board 810. Operation of the top button 730 of the brush 700 switches the light source on or off. In other brushes the light source 820 may be switched on or off by the lower button 735. The light source 820 may be switched on as a result of a signal sent from a light sensor such as a photodiode or any other appropriate means.

The light source 820 enables the inside of a mouth to be illuminated whilst periodontal pockets are being cleaned or any other parts of the gums, teeth or tongue. In some brushes, the position of the light source can be adjusted by rotation of the intermediate portion relative to the handle 705 and the arm 710. Alternatively the light source is rotatable in unison with the arm such that light is always directed towards the brush filaments. The light source 820 is advantageous in that it can facilitate more precise brushing of periodontal pockets. Further, the position of the light source in some brushes may be able to be adjusted according to user preference and according to the position in the mouth of the particular periodontal pocket being cleaned.

The brush 700 comprises a liquid delivery system. The liquid delivery system includes: a pump 830; a reservoir 835; a port 840 of the reservoir 835; and tubing 845. The liquid delivery system is configured to deliver liquid through the brush head 740 around the area where the brush filaments 745 are mounted. The liquid delivery system enables a periodontal pocket to be irrigated whilst being brushed by brush filaments 745. Irrigation of a dental pocket allows plaque which is disrupted and dislodged during brushing to be flushed away. The liquid delivery system therefore allows for more effective cleaning of periodontal pockets.

The pump 830 is mounted within the interior of the handle 705. The pump 830 is connected to the battery 805 via an electrical connection. The battery 805 powers the pump 830. Liquid can be fed into the pump via an input tubing 850. The input tubing 850 is connected to the pump 830 at an input point of the pump 830. The input tubing is connected at its other end to the reservoir 835.

The reservoir 835 is mounted towards the top of the interior of the handle 705. The reservoir 835 may be held in place by the moulding of the interior of the handle 705. The reservoir is configured to hold up to 15 to 100 ml of liquid. Smaller or larger reservoirs may be incorporated into other brushes. The reservoir 835 and sidewall of handle 705 may be made at least partly out of see-through material so that the amount of fluid in the reservoir 835 can be viewed by a user.

In addition or alternatively, a level meter indicating how much fluid is present in the reservoir may be incorporated into the brush.

The reservoir 835 comprises a port which joins to a hole in the sidewall of the handle. The port 840 is situated towards the top of the reservoir 835. The location of the port 840 means that the reservoir can be nearly completely filled when in a vertical orientation without liquid beginning to leak out of the brush 700. The reservoir 835 can be completely filled when the brush 700 is in a horizontal orientation. The handle 705 comprises an associated lid 746 configured to removably attach to the brush 700 and cover the port 840 so no liquid can dispel from the reservoir 835.

The pump 830 of the fluid delivery system comprises an output. The tubing 845 is connected to the output of the pump 830. The tubing extends through the interiors of the handle 705, the intermediate portion 715 and the arm 710. The tubing 845 is mounted within each of the handle 705, the intermediate portion 715 and the arm 710. The tubing 845 is made of a flexible material. The flexible material may allow the tubing 845 to twist in conjunction with any rotation of the arm 710 or intermediate portion 715, but in this brush there is a connection which allows 360 degree rotation clockwise and anticlockwise it may have an 'o' ring to seal the connection. At the brush head 740, the tubing bends in conjunction with the arm and joins to the circular face of the brush head 740. Holes in the circular face of the brush head allow liquid to be dispelled from the tubing 845.

The liquid delivery system can be operated as described below. The lid 746 of the handle 705 can be removed and the reservoir 835 filled with liquid. The pump 830 can be switched on by the operation of the lower button 735 of the handle 705. By pressing the lower button 735, the operation of the button can be communicated electrically or mechanically to the electronics board 810. The electronics board 815 can then signal, via an electrical connection within the battery 805 mounting, for the pump 830 to be switched on. Liquid is then drawn by the pump 830 from the reservoir and fed through the tubing 845 to the brush head. Liquid is then dispelled from a hole in this exemplary brush head 740, and effectively through the brush filaments 745. In other brushes, the electrical pump may be replaced with a mechanically operated pump. In these other brushes, liquid may be dispelled from the brush head by operation of a hand pump or plunger. Alternatively, the handle and reservoir of a brush may be made of a resiliently deformable material which enables the reservoir to be compressed so as to force liquid through the tubing to the brush head.

The brush 700 comprises junction 855 that rotates in unison with the intermediate portion 715. The junction 855 is situated within the interior of the intermediate portion 715 of the handle 705. The junction 855 houses a section of the tubing 845. The junction also houses a section of the electrical connection 825 between the light source 820 and the electronics board 810. A similar junction may be present between the intermediate portion 715 and the arm 710. However, the junction would not hold a section of the electrical connection 825.

To protect the tubing 845 and the electrical connection 825, rotation of the arm and intermediate portion relative to the handle may be restricted to a certain number of degrees, such as 180°. Such a restriction could be implemented by an introduction of a stopper into the interior of the relevant components.

Further, the meeting points of the arm 705 and intermediate portion 715 and the intermediate portion 715 and the handle 705 may comprise O-rings. O-rings may be situated along the seams of the sidewalls where the handle 705, intermediate portion 715 and arm 705 meet. The O-rings may prevent liquid for entering the interior of the brush 700 and damaging, for example, the electronics board.

The battery 805 is connected to the conical recession situated at the bottom of the handle 705 by an electrical connection 860. The electrical connection 860 is configured such that it can be connected to a power source communicated through the stand 750. The male and female components of the handle 705 and stand 750 can be configured in multiple ways to allow the battery 805 to be charged while the brush 700 is docked on the stand 750.

It is important to note that the distribution and position of components within a brush may be in different locations. The distribution, position, size and mass of components within a brush may be customised such that the brush in question has a preferable centre of mass. Having a preferable centre of mass may allow the brush to rest on a flat surface in a vertical orientation without any support. Further, another preferable centre of mass may allow the brush to dock on a stand at a certain inclination.

Typical methods for using the exemplary brush 700 of FIG. 7, by way of example, will be described below. A person skilled in the art will appreciate that the methods described below could be incorporated with other brushes and variants to the brushes described herein. Further, the skilled person will appreciate that the methods are not limiting, but merely illustrative examples intended to assist the reader in understanding the advantages of the brush.

Prior to using the brush 700, a user may wish to check the amount of liquid present in the reservoir 835 of the fluid delivery system. If required, the user may recharge the reservoir 835 with liquid. The liquid held in the reservoir may be water, a dental solution (such as cholohexidine or a fluoride mouthwash) or a combination thereof. It may also be necessary to charge the battery 805 of the brush 700 by docking the brush on the stand 750 (connected to a power supply) for a predetermined amount of time.

The user may also wish to adjust the orientation of the arm 710 and intermediate portion 715 of the brush 700 prior to use. The user may wish to use the brush 700 to firstly clean periodontal pockets situated next to the lower teeth of their mouth (lower periodontal pockets). Similarly, the user may adjust the arm 710 and intermediate portion 715 so that the brush filaments 745 are situated at the front of the brush 700. In this configuration, the brush filaments point substantially downwards when the handle 705 of the brush 700 is held in a vertical position.

To clean their lower periodontal pockets, the user may firstly grip the handle 705 of the brush 700 and insert the arm portion 710 into their mouth. The user may choose to hold the handle 705 substantially vertically when using the brush 700. Further, the user may choose to hold the handle 705 below their lower-lip so that they have a less obstructed view (via a mirror) into their mouth.

To assist with viewing the inside of their mouth, the user may opt to switch on the light source 820 of the brush 700. The light source 820 can be switched on by operating the top button 730 of the handle 705. Optionally the light source 820 can be switched on by pressing the top button 730 once, and switched off by pressing the button 730 again. Alternatively, it may be required for the button 730 to be continuously pressed down for light source 820 to be on. Ideally the light source 820 and intermediate portion 715 would be located outside of the mouth during brushing. However, the light source 820 may be located inside the mouth for cleaning periodontal pockets situated adjacent to upper and lower molar teeth. The intermediate portion 715 can be rotated so that the light source 820 is the most useful position to assist the user.

The user may identify a lower periodontal pocket in their mouth for cleaning. The user may partially insert the brush filaments 745 of the brush 700 into the periodontal pocket. The user may choose to switch on the pump 830 of the liquid delivery system; the pump can be switched on by operation of the bottom button 735 of the handle 705. Optionally the pump 830 can be switched on by pressing the bottom button 735 once, and switched off by pressing the button 735 again. Alternatively, it may be required for the button 735 to be continuously pressed down for pump 830 to run. Switching on the pump 830 will cause liquid from the reservoir 835 to be dispelled from the brush head 740. The liquid will be dispelled through the brush filaments 745. The liquid dispelled can be used to irrigate the periodontal pocket of the user. In combination with brushing, the irrigation of the periodontal pocket helps to remove any dental plaque residing in it.

If the user decides to clean periodontal pockets situated next to the upper teeth of their mouth (upper dental pockets) the user may choose to readjust the configuration of the brush 700. The user may rotate the intermediate portion 715 and arm 710 of the brush by 180° so that they face in the opposite direction to the front of the brush 700. In this configuration, the brush filaments point substantially upwards when the handle 705 of the brush 700 is held in a vertical position. The above configuration is advantageous as it allows a user to hold the brush 700 in a similar position below their lower lip when cleaning their upper periodontal pockets when compared to brushing their lower periodontal pockets. Holding the brush 700 in this position is advantageous as it minimises obstruction of the user's view (via a mirror) inside their mouth.

Once a user has finished cleaning, the brush 700 may be cleaned and placed on the stand 750 for charging.

The methods described above are similar to methods which could be employed by a healthcare professional (i.e. a dentist or hygienist) who is using the brush 700 to clean periodontal pockets or any other part of the mouth as described above, of a patient.

Figure 9:
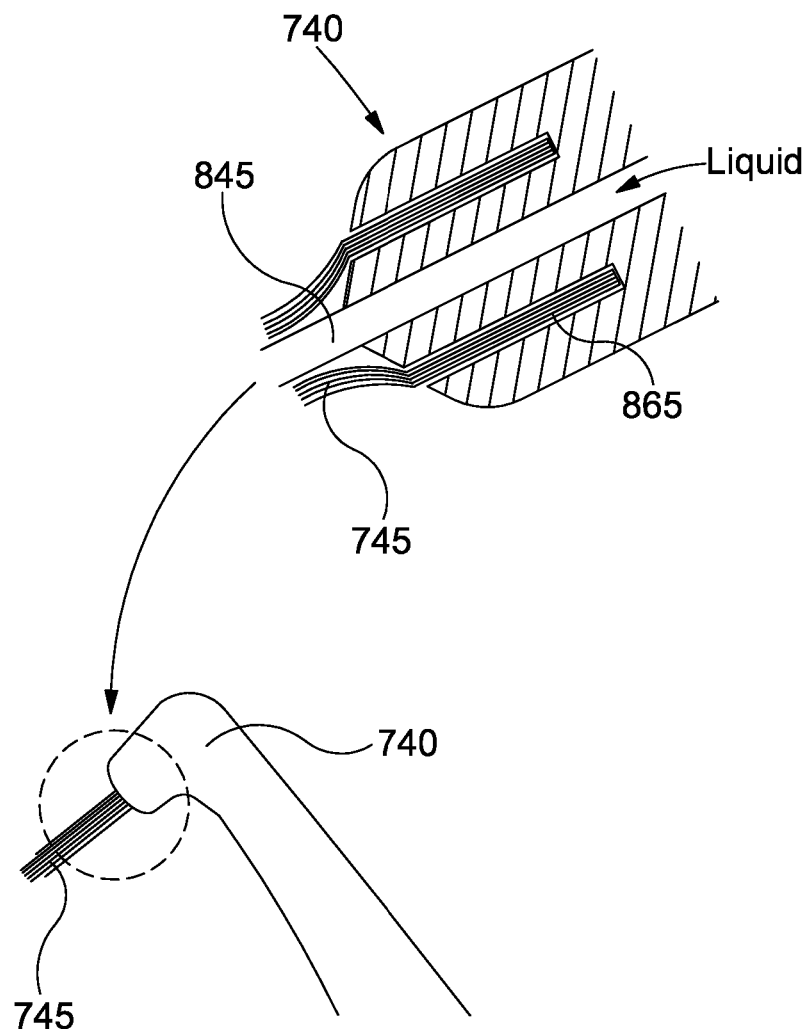
FIG. 9 shows a close-up and a cross section view of a brush head of a brush.

FIG. 9 shows a cross section of a brush head of the exemplary brush 200 of FIGS. 7 and 8. The tubing 845 of the brush for transporting liquid extends through a hole in the brush head 740. Surrounding the tubing 845 brush filaments 745 are secured within a recession in the brush head 740. Only a fraction of each filament is secured within the recession in the brush head 740, with the remainder of each filament extruding from the brush head 740. The filaments are secured to the brush head such that they are substantially parallel with the tubing 845. The filaments are secured in place on the brush head by any of a compression fit, a non-toxic adhesive or any combination thereof. On surface of the brush head 740 where the filaments extrude, the filaments bend inwardly with respect to a central axis of the tubing to form a single collection of substantially parallel filaments. When liquid is dispelled from the brush head 740 via the tubing it passes through and out of the collection of filaments, thereby irrigating the area being cleaned.

Figure 10:
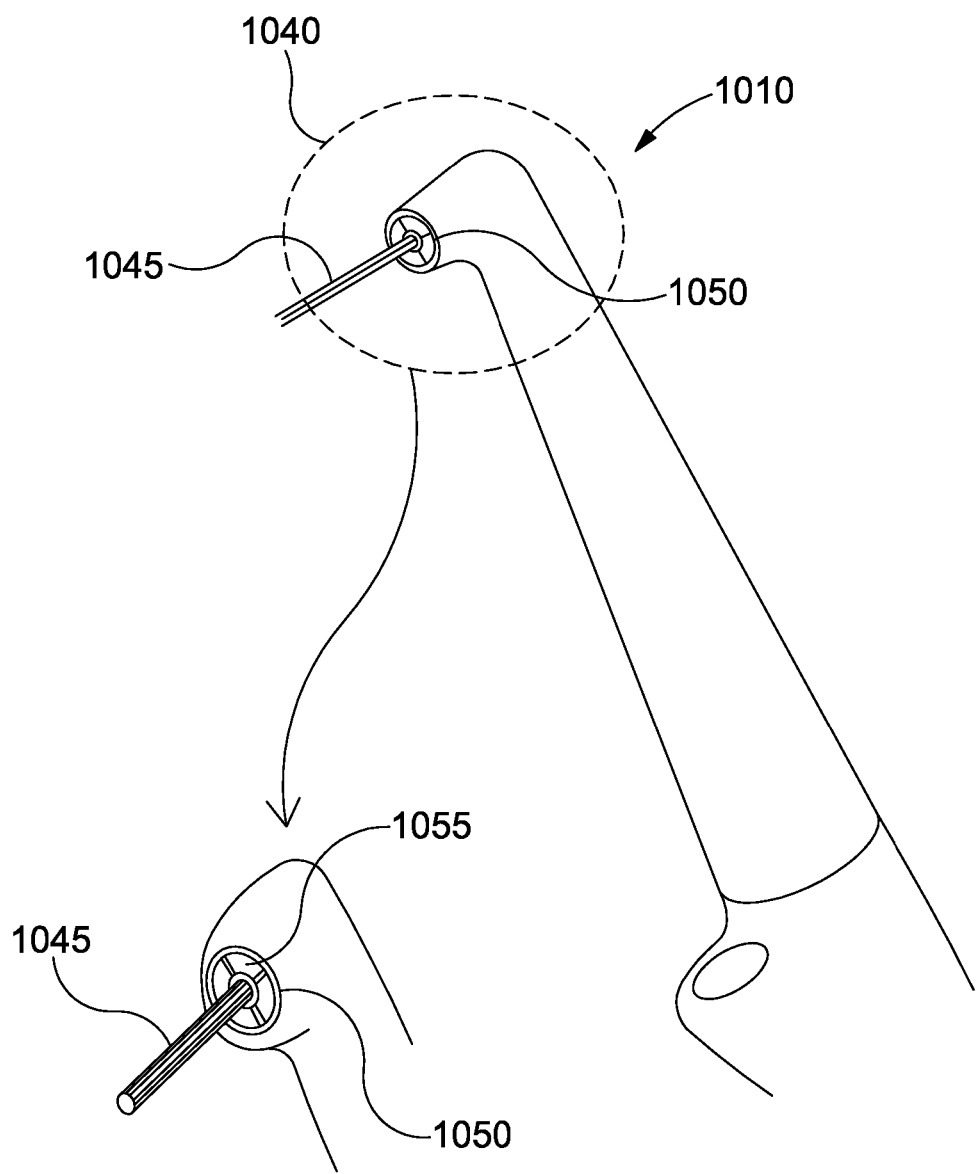
FIG. 10 shows an alternative arm 1010 for use with the exemplary brush 200 of FIGS. 7 and 8.

FIG. 10 shows an alternative arm 1010 for use with the exemplary brush 200 of FIGS. 7 and 8. The arm 1010 comprises a brush head 1040. The brush head 1040 is configured differently to the exemplary brush head 740 outlined in FIG. 9 and shown in FIG. 7. In the brush head 1040 shown in FIG. 10, brush filaments 1045 extend from a central portion on a face 1050 of the brush head 1040. Surrounding the central portion of the face 1050 are four evenly distributed apertures 1055 from which fluid can be dispelled out of the brush head 1040. In other embodiments any number of apertures may be present in other exemplary brush heads. The apertures 1055 form a ring-like structure around the brush filaments 1045. The ring-like structure enables fluid to be dispelled out of the brush head 1040 in proximity to the brush filaments 1045. As the fluid passes along the brush filaments it may also adhere to the brush filaments by capillary action.

Figure 11:
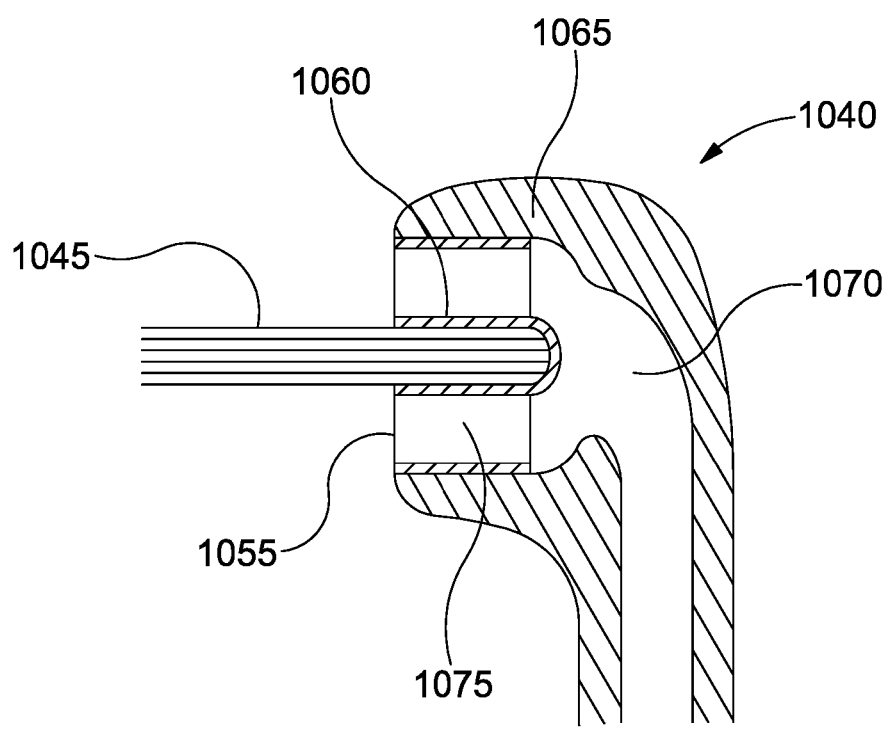
FIG. 11 shows a cross-section of the exemplary brush head 1040 shown in FIG. 10.

FIG. 11 shows a cross-section of the exemplary brush head 1040 shown in FIG. 10. The brush filaments 1045 extruding from the brush head 1040 are secured to the brush head within a central recessed member 1060. The brush filaments 1045 may be secured in place by any means as described above. The central recessed member 1060 is itself secured in place in the brush head 1040 by a series of supporting members which connect to an outer shell 1065 of the brush head 1040.

The brush head 1040 comprises tubing 1070 which connects to tubing of the remainder of the arm 1010. The tubing 1070 is configured to direct fluid originating from the reservoir 835 of the brush 200 to the apertures 1055 on the face 1050 of the brush head 1040. In order to be able to direct fluid towards the apertures 1055 on the face 1050 of the brush head 1040, the tubing 1070 undergoes a change in direction and increases in diameter as it approaches the face 1050 on the brush head 1040. This arrangement of the tubing 1070 defines channels 1075 adjacent to the central recessed member 1055 in which fluid can travel to and out of the face 1050 on the brush head 1040.

In other brushes, the filaments may be attached to the brush head in different ways. In addition, the filaments may extrude from the brush head at an angle to the normal of the face of the brush head. In other words, the filaments may be inclined at an angle with respect to the central axis of the tubing. In some brushes, the brush head may comprise means of adjusting the orientation of the filaments of the brush with respect to a central axis. The means could comprise a ball joint fitted to the brush head from which the filaments extrude.

In other brushes, the brush filaments may not be substantially parallel. The brush filaments may purposefully be irregular in orientation. The brush may comprise a set filaments extruding from the brush head, wherein additional brush filaments extrude from an end of each of the filaments of the set. Such a configuration may allow more effective cleaning of sidewalls of a periodontal pocket and other areas of a mouth.

Additional dental tools and brushes may be configured to be attachable to the brushes described above. The dental tools could be configured to replace the arm of a brush described above. Alternatively, or in addition, the dental tools could be configured to replace the arm and intermediate portion of a brush. The dental tools may comprise one or more light sources. A dental tool may comprise an arm and brush head with no brush filaments and just the liquid delivery system. The dental tool may comprise any of:
  interdental brushes;
  interdental brushes with a substantially conical shape;
  rubber tapered points with rubber bristles (typically used for cleaning in-between teeth and restorations);
  sponge-like points;
  floss and/or tape;
  tongue cleaners;
  tongue scrapers;
  irrigation tubes;

an oscillating head (rounded head for general cleaning of teeth); and professional dental tool attachments (mirror, probe, scaler, excavator etc.).

The brushes as described above may further comprise an electric motor and rotary means configured to rotate the brush filaments at the brush head. The electric motor could be operated by one or more buttons located on the handle or by other input means. The motor may be powered by the same battery as that powering an electric pump of the brush.

Figure 12:
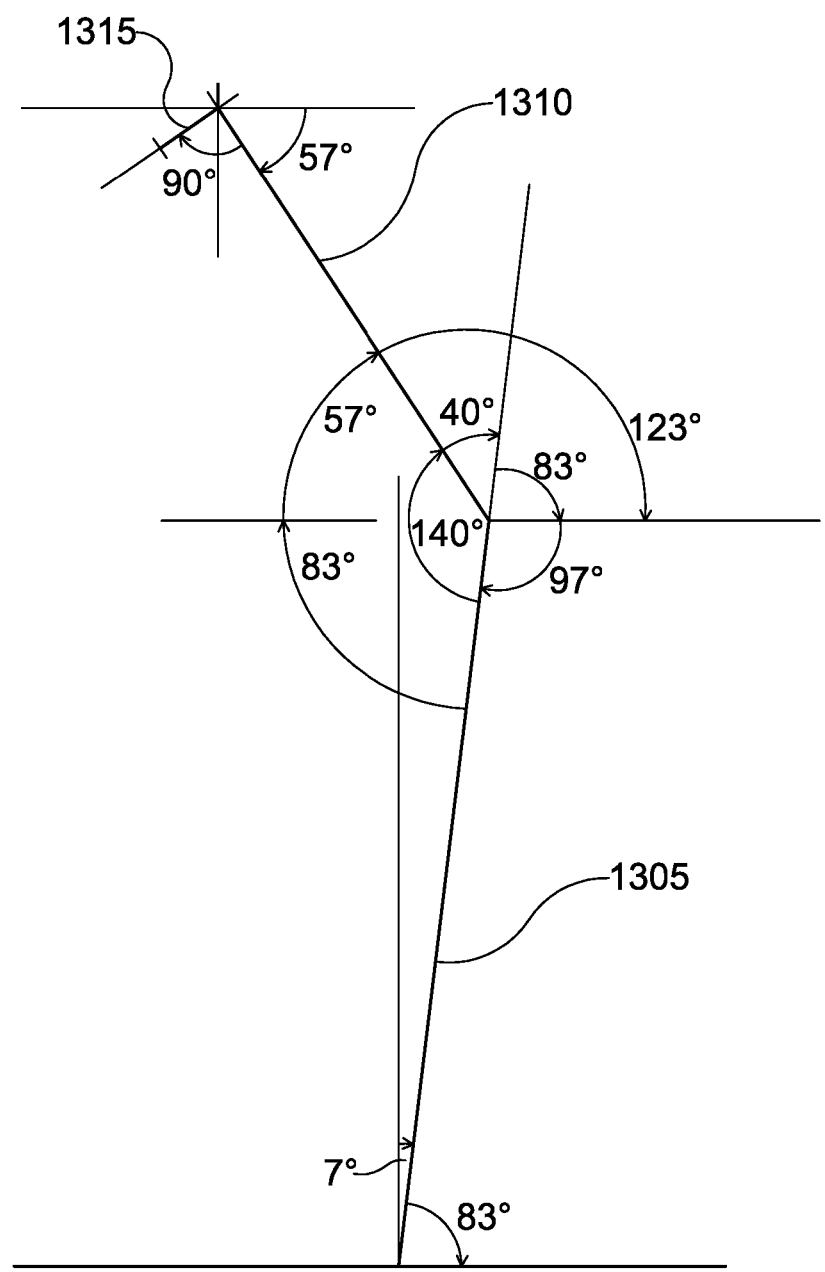
FIG. 12 shows preferred relative angles of central axes of components of an exemplary brush.

FIG. 12 shows the preferred relative angles of the central axes of components of an exemplary brush. The central axis 1305 of the handle of the brush preferably forms an angle of 140° with the central axis 1310 of the intermediate portion and arm which extend from the handle. Preferably the brush filaments 1315 form an angle of 90° with the central axis 1310 of the intermediate portion and arm of the brush. The handle of the brush is inclined when resting on a flat surface with the brush in its vertical orientation. Preferably the handle has an angle of inclination of 7° when the brush rests vertically on a flat surface. That is, the central axis 1305 of the handle has an angle of inclination of 7°.

The skilled person will be able to envisage further exemplary brushes, as set out in the accompanying drawings.

The invention claimed is:

1. A brush for cleaning a periodontal pocket between a tooth and a gum of a user at a full depth of at least 4 mm into the periodontal pocket, the brush comprising:
a handle portion;
an arm extending from the handle portion;
a brush head located at an end of the arm having a plurality of brush filaments extending therefrom and configured to be inserted into the full depth into the periodontal pocket to provide said cleaning, wherein all of the plurality of brush filaments are configured to be simultaneously inserted into the full depth into the periodontal pocket;
a light source for illuminating the inside of a mouth when the brush is in use, wherein an angle between a central axis of the handle portion and a central axis of the arm is in the range of 120 to 170 degrees; a reservoir for holding a liquid; and a pumping system configured to deliver the liquid to the brush head,
wherein the arm is rotatable about its central axis and relative to the handle portion between first and second positions, wherein in the first position, the handle portion is configured to be positioned such that a user's hand gripping the handle portion is lower than the user's mouth while cleaning lower periodontal pockets, and wherein in the second position, the handle portion is configured to be positioned such that the user's hand gripping the handle portion is lower than the user's mouth while cleaning upper periodontal pockets.

2. The brush of claim 1, wherein the plurality of brush filaments have a collective diameter no greater than 6 mm.

3. The brush of claim 1, wherein the light source is attached to an intermediate portion of the brush that is situated between the handle portion and the arm.

4. The brush of claim 3, wherein the intermediate portion is rotatable about the central axis of the arm and relative to the arm.

5. The brush of claim 1, wherein the pumping system is configured to deliver the liquid from the brush through the plurality of brush filaments extending from the brush head.

6. The brush of claim 1, wherein said brush head comprises a plurality of apertures formed around the outside of said plurality of brush filaments, said apertures being in fluid communication with said reservoir so as to allow fluid to be expelled from said apertures by said pumping system.

7. The brush of claim 6, wherein said apertures are formed only around the outside of said plurality of brush filaments.

8. The brush of claim 1, wherein the reservoir is rechargeable and the brush comprises a port for the input of liquid into the reservoir.

9. The brush of claim 1, further comprising an internal battery for powering the light source.

10. The brush of claim 1, further comprising an internal battery for powering the pumping system.

11. The brush of claim 1, further comprising one or more buttons for operating the light source.

12. The brush of claim 1, further comprising one or more buttons for operating the pumping system.

13. The brush of claim 1, wherein a removable base of the handle portion comprises feet configured to allow the brush to stand vertically on a substantially flat surface.

14. The brush of claim 3, wherein the arm is detachable from the intermediate portion and handle portion of the brush.

15. The brush of claim 14, wherein the handle portion is configured such that other dental tools, for cleaning at least tongues, interproximal areas between teeth, and/or around restorations, may be attached.

16. A brush apparatus comprising the brush of claim 1 and further comprising an associated stand, wherein one of the brush or stand comprises a male portion and the other of the brush or the stand comprises a female portion, the male and female portions configured to cooperate such that the brush is able to rest substantially vertically on the stand.

17. The brush apparatus of claim 16, wherein the handle portion comprises an induction coil and the associated stand is configured to supply electricity to the brush to charge a battery therein.

18. A brush configured to clean periodontal pockets at a full depth of at least 4 mm into the periodontal pocket, the brush comprising:
a handle portion;
an arm extending from the handle portion;
a brush head located at an end of the arm having a plurality of brush filaments extending therefrom and configured to be inserted into a periodontal pocket, wherein all of the plurality of brush filaments are configured to be simultaneously inserted into the full depth into the periodontal pocket;
a light source for illuminating the inside of a mouth when the brush is in use; a reservoir for holding a liquid; and a pumping system configured to deliver the liquid to the brush head,
wherein an angle between a central axis of the handle portion and a central axis of the plurality of brush filaments is in the range of 30 to 80 degrees, and
wherein the arm is rotatable about its central axis and relative to the handle portion between first and second positions, wherein in the first position, the handle portion is configured to be positioned such that a user's hand gripping the handle portion is lower than the user's mouth while cleaning lower periodontal pockets, and wherein in the second position, the handle portion is configured to be positioned such that the user's hand gripping the handle portion is lower than the user's mouth while cleaning upper periodontal pockets.

* * * * *